United States Patent
Szklarzewicz et al.

(10) Patent No.: US 11,691,886 B2
(45) Date of Patent: Jul. 4, 2023

(54) SYNTHESISING A MOLECULAR MAGNETIC MATERIAL

(71) Applicant: Uniwersytet Jagiellonski, Cracow (PL)

(72) Inventors: Janusz Szklarzewicz, Cracow (PL); Maciej Hodorowicz, Cracow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 314 days.

(21) Appl. No.: 17/067,777

(22) Filed: Oct. 12, 2020

(65) Prior Publication Data

US 2021/0107802 A1    Apr. 15, 2021

(30) Foreign Application Priority Data

Oct. 11, 2019   (PL) ......................................... 431440

(51) Int. Cl.
| | | |
|---|---|---|
| *C01C 3/12* | (2006.01) | |
| *C01C 3/11* | (2006.01) | |
| *C07F 11/00* | (2006.01) | |
| *H01F 1/42* | (2006.01) | |

(52) U.S. Cl.
CPC ................. *C01C 3/12* (2013.01); *C01C 3/11* (2013.01); *C07F 11/00* (2013.01); *H01F 1/42* (2013.01); *C01P 2006/42* (2013.01)

(58) Field of Classification Search
CPC ... C01C 3/11; C01C 3/12; C07F 11/00; H01F 1/42; C01P 2006/42
See application file for complete search history.

(56) References Cited

FOREIGN PATENT DOCUMENTS

| | | | |
|---|---|---|---|
| CN | 104356169 | * | 10/2010 |
| CN | 101853728 | * | 2/2015 |

* cited by examiner

*Primary Examiner* — C Melissa Koslow
(74) *Attorney, Agent, or Firm* — Mark M. Friedman

(57) ABSTRACT

A method for synthesising a molecular magnetic material from a paramagnetic reactant including a d-electron metal in a paramagnetic form, a diamagnetic reactant comprising a d-electron metal in a diamagnetic form, and at least one donor of cyanide (CN—) ligands being a separate compound and/or contained in the paramagnetic reactant and/or in the diamagnetic reactant.

16 Claims, 1 Drawing Sheet

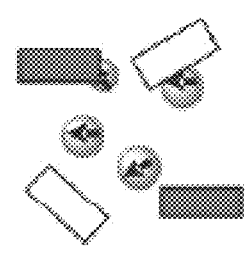 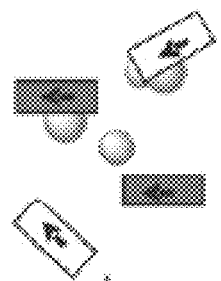 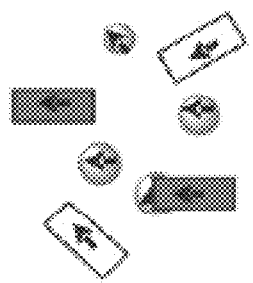
  
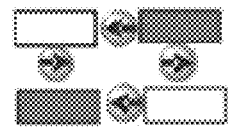 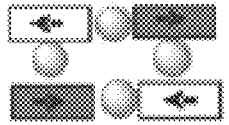 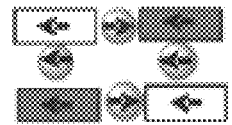
Fig. 1A        Fig. 1B        Fig. 1C
PRIOR ART

SYNTHESISING A MOLECULAR MAGNETIC MATERIAL

TECHNICAL FIELD

The invention generally relates to a method for synthesising a molecular magnetic material and a molecular magnetic material obtained by this method.

BACKGROUND

Molecular magnetic materials are a class of materials with magnetic properties that exhibit features which are typical for classical magnets, i.e. the magnets comprising transition metals and rare earth elements, as well as the features that are not typical for the classical magnets, such as: temperature spin-transitions, photomagnetism or low density.

There are known organic-inorganic molecular materials that consist of building blocks constituted by organic blocks and inorganic blocks, which become magnetically ordered under specific temperatures to form different structures: one-dimensional (1 D) structures having a form of chains, two-dimensional (2D) structures having a form of flat networks, or three-dimensional (3D) structures having a form of spatial networks. In general, the inorganic blocks in materials of this type are metal ions, and the organic blocks may be organic counter-ions. The ions can be carriers for unpaired electrons. Due to magnetic ordering, the unpaired electrons can form systems with parallel or anti-parallel spins, defining magnetic properties of a material: ferromagnetic, ferrimagnetic or antiferromagnetic.

Typically, at higher temperatures, such as at 0° C. or at a room temperature, magnetic materials lose their ability of magnetic ordering of organic and inorganic blocks, thus losing their magnetic properties. A temperature, which is considered to be a threshold above which the system of organic and inorganic blocks loses the ability to magnetically self-order, is called the Curie temperature (Tc), also known as the critical temperature. The higher the critical temperature (Tc) of a material, the higher the temperature at which the material loses its magnetic properties. FIGS. 1A-1C show schematically three methods of magnetic ordering of various magnetic materials that contain organic blocks schematically represented as rectangles and inorganic blocks schematically represented as circles, with unpaired electron spins schematically marked with arrows. FIGS. 1A-1B show a molecular magnetic material in which the inorganic blocks (FIG. 1A) or the organic blocks (FIG. 1B) are carriers of unpaired electrons (so-called electron spin carriers). FIG. 10, in turn, is a schematic representation of a structure of a material wherein organic and inorganic blocks are carriers of unpaired electrons. Above the Tc temperature, the organic and inorganic blocks in materials of this type remain unordered. When the temperature decreases to Tc or below Tc, these blocks become magnetically ordered, so that inorganic and organic blocks "merge" to result in a particular alignment of electron spins, which is schematically marked with arrows. In ferromagnetic materials, at and below the Tc temperature, parallel ordering of unpaired electron spins of respective blocks can be observed, so that adjacent spins have not only the same direction but also the same spin (orientation). The range of the spin ordering (the size of magnetic domains) may largely depend on both the material and the conditions of the synthesis.

Among the known molecular magnetic materials, there are only a few that have higher values of Tc, at which they exhibit ferromagnetic properties. Above Tc the ferromagnetic materials become typical paramagnetic materials, and cannot therefore be used as memory storage systems.

The class of 3D network-forming molecular magnetic materials includes Prussian blue having the formula of $Fe^{III}_4[Fe^{II}(CN)_6]_3 \cdot 14H_2O$, which exhibits low-range ferromagnetic ordering below the critical temperature Tc=5.6 K, while above this temperature, the Prussian blue loses its ferromagnetic properties.

There are known analogues of Prussian blue, wherein the $Fe^{II}$ or $Fe^{III}$ atoms are substituted with ions of other metals. In compounds of this type, building blocks are complex ions: $[A(CN)_6]^{n-}$, where A=Fe or Cr.

Other analogues of the Prussian blue, wherein $Fe^{II}$ and $Fe^{III}$ iron, respectively, is substituted with ions of other metals ($M_1$, $M_2$) from the 3d-block of the periodic system, include compounds with a formula $AM_1[M_2(CN)_6] \cdot xH_2O$, wherein A denotes a non-magnetic ion providing a zero charge of the basic cell of the material.

Magnetic coupling between the respective building blocks, the metal ions in Prussian blue analogues, is described by the mechanism of interactions transferred by cyanide ligands (—CN). Due to these interactions, electron spins of unpaired electrons align so as to form a magnetic ordering below the critical temperature (Tc), which in Prussian blue is the so-called ferromagnetic ordering.

Various molecular magnetic materials are known in the prior art. Two different molecular magnetic materials based on cyanide ligands are known from Chinese patent applications CN101853728 and CN104356169. Both materials are polymers with structures comprising metals Mn and Cr, respectively, bridged by cyanide (—CN) moieties. These materials exhibit some magnetic properties, although they are not ferromagnetic materials of high Curie temperature (Tc).

Accordingly, the methods for synthesising molecular magnetic materials comprise the formation of a polymeric structure with bridges made of cyanide ligands (—CN), wherein the reactions leading to the formation of such bridges use at least one reactant having either free sites for coordination of cyanic nitrogen or its own labile, i.e. weakly bound ligands to allow for them to be substituted with cyanide ligands introduced into the reaction system. These synthesis conditions allow for obtaining polymers with cyanide bridging elements.

However, the methods of synthesis known so far only allow obtaining molecular magnetic materials exhibiting low-temperature ferromagnetism, i.e. the materials being ferromagnetic at temperatures close to absolute zero (0 K=−273.15° C.). Thus, it is impossible to benefit from the ferromagnetic properties of materials of this type at higher temperatures, including at room temperature.

SUMMARY OF THE INVENTION

There is a need to provide new molecular magnetic materials by designing, i.e. selecting, molecular structures of the building blocks so as to obtain the highest possible Curie temperature (Tc) of a designed material, and to provide the magnetic ordering in the designed material of ferromagnetic properties, below Tc. This aim is very difficult to accomplish, i.a. due to the fact that in order to obtain high critical temperature (Tc) of materials of this type, strong magnetic interactions in three dimensions are necessary.

There is a need to provide a method for synthesising a class of molecular magnetic materials that exhibit ferromagnetic properties at temperatures higher than 253 K (−20° C.), including in particular 0° C., and room temperatures, thus enabling the ferromagnetic properties of these materials to be exploited on a wider scale.

In particular, the invention relates to a molecular magnetic material having ferromagnetic properties at temperatures above 253 K, including at room temperature. The molecular magnetic material according to the invention is photosensitive: it undergoes photolysis when exposed to light. The above properties make it particularly suitable for producing memory carriers of a very high capacity, for use in various security systems, facilitating quick and reliable destruction of the recorded data, for example, in cases of unauthorised interception thereto.

There is disclosed a method for synthesising a molecular magnetic material, comprising the steps of: producing a mixture comprising components: a paramagnetic reactant comprising a d-electron metal in a paramagnetic form selected from the group consisting of: Fe, Co, Mo, W and Mn; a diamagnetic reactant comprising a d-electron metal in a diamagnetic form, selected from the group consisting of: Fe, Co, Mo, W and Mn; at least one donor of cyanide (CN—) ligands being a separate compound and/or contained in the paramagnetic reactant and/or in the diamagnetic reactant; at least one cation having coordination sites for binding cyanide nitrogen atoms from the donor of cyanide ligands; except for a mixture of reactants simultaneously comprising as the paramagnetic reactant: $[W(CN)_6(NN)]^-$ and as the diamagnetic reactant: $[W(CN)_6(NN)]^{-2}$, where NN is a bidentate NN-donor substituent, and next, carrying out a reaction of the components of the mixture to form coordination bonds between the cation and cyanide nitrogen atoms derived from the donor of cyanide ligands, to obtain a polycyanide complex being the molecular magnetic material.

Preferably, at least one cation is of an element selected from the group consisting of: Zr, Hf, La, Sc, Y, V, Nb, Ta, Cr, Mn, Fe, Co, Ni, Ru, Rh, Pd, Ir, Pt, Cu, Ag, Au, Zn, Cd, Hg, Ga, In, Tl, Sn, Pb, Sb, Bi, Po, Ce, Pr, Nd, Pm, Sm, Eu, Gd, Tb, Dy, Ho, Er, Tm, Yb and Lu.

Preferably, the reaction is carried out in a temperature ranging from 253 K to 400 K.

Preferably, the reaction is carried out in a temperature ranging from 293 K to 400 K.

Preferably, the paramagnetic reactant is a d-electron paramagnetic metal polycyanide complex comprising at least two cyanide ligands, constituting also a cyanide ligand donor.

Preferably, the diamagnetic reactant is a d-electron diamagnetic metal polycyanide complex comprising at least two cyanide ligands, constituting also a cyanide ligand donor.

Preferably, the diamagnetic reactant is a salt of d-electron metal in a diamagnetic form.

Preferably, the paramagnetic reactant is a salt of d-electron metal in a paramagnetic form.

Preferably, the diamagnetic reactant or the paramagnetic reactant is a salt comprising at least one of the ions selected from the group consisting of: $[Fe(CN)_6]^{3-}$, $[Fe(CN)_6]^{4-}$, $[Mo(CN)_8]^{3-}$, $[Mo(CN)_8]^{4-}$, $[Co(CN)_6]^{2-}$, $[Co(CN)_6]^{3-}$, $[Mn(CN)_6]^{3-}$, $[Mn(CN)_6]^{5-}$, $[Mn(CN)_6]^{4-}$, $[W(CN)_6(bpy)]^-$, $[W(CN)_6(bpy)]^{2-}$, $Fe^{2+}$, $Mn^{2+}$ and $Co^{2+}$.

Preferably, the step of producing the mixture comprising the paramagnetic reactant and the diamagnetic reactant comprises partial oxidation or reduction of the metal in the paramagnetic form to the diamagnetic form of that metal.

Preferably, the step of producing the mixture comprising the paramagnetic reactant and the diamagnetic reactant comprises partial oxidation or reduction of the metal in the diamagnetic form to the paramagnetic form of that metal.

Preferably, the diamagnetic reactant is a salt of d-electron metal in diamagnetic form, and the paramagnetic reactant is a salt of d-electron metal in paramagnetic form.

Preferably, the donor of cyanide ligand is synthesized from potassium cyanide (KCN) and simple slats of d-electron metals selected from the group consisting of: Fe, Co, Mo, W and Mn.

Preferably, the reaction is carried out in a solid or a liquid phase, wherein the product of the reaction carried out in the liquid phase is obtained either by precipitation thereof in the form of an insoluble salt or by evaporation of the solvent.

Preferably, the mixture of the following components is prepared: $K_4[Fe(CN)_6]$ with $K_3[Fe(CN)_6]$, or $(PPh_4)_2[W(CN)_6(bpy)].2H_2O$ with $K_3[Fe(CN)_6].H_2O$, or $K_4[Mo(CN)_8]$ with $K_3[Mo(CN)_8]$, or $K_4[Mo(CN)_8].2H_2O$ with $K_3[Fe(CN)_6].H_2O$, or $K_4[Fe(CN)_6].3H_2O$ with $K_3[Fe(CN)_6]$, or $K_3[Fe(CN)_6]$ with $FeSO_4.6H_2O$, or $K_3[Fe(CN)_6]$ with $K_3[Co(CN)_6]$, or $Na_2[Fe(CN)_5NO]$ with $K_3[Co(CN)_6]$, or $K_3[Fe(CN)_6]$ with $K_4[Mo(CN)_8].2H_2O$, or $K_4[Fe(CN)_6].H_2O$ with $FeCl_3$ mediated by KCN, or $FeCl_3$ with $FeSO_4.6H_2O$ mediated by KCN, or $K_4[W(CN)_8]$ with its oxidation product comprising W(V), or $K_3[Fe(CN)_6].H_2O$ with its reduction product comprising Fe(II), or $K_4[Fe(CN)_6].2H_2O$ with $K_3[Fe(CN)_6].H_2O$, or $(PPh_4)_3[W(CN)_7(O_2)]$ with $K_3[Fe(CN)_6]$, or $(bpyH)_3H_3O[W(CN)_8].H_2O$ with $K_3[Fe(CN)_6].H_2O$, wherein $bpyH_+$ denotes monoprotonated 2,2'-bipirydine and $PPh_{4+}$ denotes tetraphenylphosphonium cation.

The terms "$FeCl_3$ mediated with KCN" and "$FeSO_4.6H_2O$ mediated with KCN" mean that KCN participates in the reaction as one of the reactants. Thus, the reaction is done in the presence of KCN.

Further, there is disclosed a molecular magnetic material constituting a product of a reaction of the following components: a paramagnetic reactant comprising a d-electron metal in a paramagnetic form selected from the group consisting of: Fe, Co, Mo, W and Mn; a diamagnetic reactant comprising a d-electron metal in a diamagnetic form, selected from the group consisting of: Fe, Co, Mo, W and Mn; at least one donor of cyanide (CN—) ligands being a separate compound and/or contained in a paramagnetic and/or diamagnetic reactant; at least one cation having coordination sites capable for binding cyanide nitrogen atoms from the donor of cyanide ligand; except for a mixture of reactants simultaneously comprising as the paramagnetic reactant: $[W(CN)_6(NN)]^-$ and as the diamagnetic reactant: $[W(CN)_6(NN)]^{2-}$, where NN is a bidentate NN-donor substituent. The molecular magnetic material has coordination bonds between the cation and cyanide nitrogen atoms derived from the donor of cyanide ligand.

These and other features, aspects and advantages of the invention will become better understood with reference to the following drawings, descriptions and claims.

BRIEF DESCRIPTION OF FIGURES

Various embodiments are herein described, by way of example only, with reference to the accompanying drawings.

FIGS. 1A-1C show a schematic representation of a process of magnetic ordering of magnetic materials known from the prior art that contain organic and inorganic building blocks.

DETAILED DESCRIPTION

The following detailed description is of the best currently contemplated modes of carrying out the invention. The description is not to be taken in a limiting sense, but is made merely for the purpose of illustrating the general principles of the invention.

Molecular magnetic materials obtained by the method according to the invention are high-temperature ferromagnetic materials that exhibit ferromagnetic properties at relatively high temperatures, i.e. above 253 K, that is above −20° C., and in particular at room temperature.

The molecular magnetic material obtained by the method according to the invention is photosensitive, i.e. it undergoes photolysis when exposed to light with a wavelength in the range of CT (charge-transfer) bands as well as d-d electron transitions. Because cyanide ligands cause intense splitting of d orbitals, the d-d bands typically occur at wavelengths below 500 nm (e.g. at 420 nm for the $[W(CN)_8]^{4−}$ ion or the $[Mo(CN)_8]^{4−}$) ion; it depends, however, on other ligands being present in the complex used. CT bands of cyanide complexes occur most often at higher energies, that is to say in the ultraviolet range. In mixed cyanide complexes, such as in the $[W(CN)_6(bpy)]^{2−}$ ion, where bpy denotes 2,2'-bipyridine, CT bands from metal to ligand may occur at low energies (e.g. above 500 nm, as for the $[W(CN)_6(bpy)]^{2−}$) ion thus causing its increased photoactivity to low energy light. In magnetic materials, in which charge-transfer electron-transitions between cation and anion are further observed (as e.g. in Prussian blue), CT bands may extend even to near infrared.

The above characteristics make the material according to the invention suitable for i.a. production of magnetic switches having a short operating time and as materials for magnetic coatings for producing discs and storage media with a very high capacity, which can be used i.a. in security systems. For example, information stored on a disc having a magnetic coating made of the material according to the invention can be quickly and reliably destroyed by exposing the disc to light or heating it to the temperature above Tc; for ferromagnetic liquids, it is sufficient to exceed the freezing point of the liquid.

The synthesis of the molecular magnetic material according to the invention includes the following steps:

producing a mixture of a paramagnetic reactant comprising a d-electron metal in a paramagnetic form and a diamagnetic reactant comprising a d-electron metal in a diamagnetic form;

providing a donor of cyanide ligand, wherein the donor of cyanide ligand may be a compound comprising cyanide (—CN) moieties and a d-electron metal: in paramagnetic, diamagnetic or both forms simultaneously; and producing a polycyanide complex by reacting the produced mixture with a cation that has free (labile) coordination sites and is capable of binding nitrogen atoms of cyanide ligands. This cation may belong to elements from the group of d-electron, f-electron and selected p-electron metals. Binding the nitrogen atoms of cyanide (—CN) ligands may be either passive, in which case the product of the reaction is a solid magnetic material, or labile, in which case the product of the reaction is a liquid ferromagnetic material.

The donor of cyanide ligand, in paramagnetic or diamagnetic form, denotes cyanide complexes of d-electron metals such as: Fe, Co, Mo, W and Mn, comprising at least 2 cyanide (—CN) ligands that bind to this metal. The cation with free coordination sites is to be understood the cation of d-electron, f-electron and selected p-electron metal, such as cations of the following elements: Zr, Hf, La, Sc, Y, V, Nb, Ta, Cr, Mn, Fe, Co, Ni, Ru, Rh, Pd, Ir, Pt, Cu, Ag, Au, Zn, Cd, Hg, Ga, In, Tl, Sn, Pb, Sb, Bi, Po, Ce, Pr, Nd, Pm, Sm, Eu, Gd, Tb, Dy, Ho, Er, Tm, Yb and Lu.

In the synthesis method according to the invention, the same or different d-electron metals may be used in one material, in their paramagnetic and diamagnetic form, respectively, if the metal can have these two forms.

For example, a single reaction may employ a pair of reactants: a diamagnetic reactant and a paramagnetic reactant, comprising the following d-electron metals:

$Fe^{II}$ (component of diamagnetic reactant) with $Fe^{III}$ (component of paramagnetic reactant), $W^{IV}$ (component of diamagnetic reactant) with $W^{V}$ (component of paramagnetic reactant), $Mo^{IV}$ (component of diamagnetic reactant) with $Mo^{V}$ (component of paramagnetic reactant), $W^{IV}$ (component of diamagnetic reactant) with $Fe^{III}$ (component of paramagnetic reactant)

$Mo^{IV}$ (component of diamagnetic reactant) with $Fe^{III}$ (component of paramagnetic reactant)

$Co^{III}$ (component of diamagnetic reactant) with $Fe^{III}$ (component of paramagnetic reactant).

The conditions of the synthesis according to the invention allow to obtain a molecular magnetic material based on d-electron metal polycyanide complexes, comprising diamagnetic and paramagnetic metal in their structure, with Curie temperature of this material exceeding 253 K and with ferromagnetic properties at this temperature, and also having magnetic photosensitivity.

The synthesis method as described above can be conducted with various substrates. More particularly:

in one embodiment of the synthesis, the paramagnetic reactant may be used, which is also the donor of cyanide ligand: the paramagnetic reactant is a polycyanide complex comprising at least two cyanide ligands $(M^{para}(CN)_x$, where $x≥2)$ coordinated by a d-electron metal in its paramagnetic form ($M^{para}$). This paramagnetic reactant may be a complex salt of the exemplary formula: $A_y[M^{para}(CN)_x]$. Non-limiting examples of such reactants include i.a. $K_3[Fe(CN)_6]$, $K_3[Mo(CN)_8]$, $K_3[W(CN)_8]$, $K_2[Co(CN)_6]$, $K_3[Mn(CN)_6]$, $K_5[Mn(CN)_6]$, $K_4[Mn(CN)_6]$, $Cs[W(CN)_6(bpy)]$, $AsPh_4[W(CN)_6(bpy)]$, $K_3[Cr(CN)_6]$, wherein Ph denotes phosphonium. The diamagnetic reactant used, in turn, may also be a donor of cyanide ligand or may contain no cyanide ligands and take for example the form of salt: $(M^{dia}B)$, non-limiting examples of the diamagnetic reactant include the following: $FeSO_4$, $MnSO_4$, $CoCl_2$, $K_4[Fe(CN)_6]$, $K_4[Mo(CN)_8]$, $K_4[W(CN)_8]$, $K_4[Co(CN)_6]$, $Na_2[W(CN)_6(bpy)]$;

in another embodiment of the synthesis, the diamagnetic reactant may be used, which is also the donor of cyanide ligand: the diamagnetic reactant is a polycyanide complex comprising at least two cyanide ligands $(M^{dia}(CN)_x$, where $x≥2)$ coordinated by a d-electron metal in its diamagnetic form ($M^{dia}$). This diamagnetic reactant may be a complex salt of the exemplary formula: $A_y[M^{dia}(CN)_x]$. Non-limiting examples of such reactants include i.a. $(PPh_4)_3[W(CN)_7(O_2)]$, $K_4[Fe(CN)_6]$, $K_4[Mo(CN)_8]$, $K_4[W(CN)_8]$, $K_3[Co(CN)_6]$, $Cs_2[W(CN)_6(bpy)]$, $(PPh_4)_2[W(CN)_6(bpy)]$. The paramagnetic reactant used, in turn, may also be the donor of cyanide ligand or it may contain no cyanide ligands and take for example the form of salt:$(M^{para}B)$, non-limiting examples of the paramagnetic reactant include the following: $K_3[Fe(CN)_6]$, $K_3[Mo(CN)_8]$, $K_3[W(CN)_8]$, $K_2[Co(CN)_6]$, $K_3[Mn(CN)_6]$, $K_5[Mn$ (CN)$_6$], K$_4$[Mn(CN)$_6$], Cs[W(CN)$_6$(bpy)], AsPh$_4$[W(CN)$_6$(bpy)], K$_3$[Cr(CN)$_6$], Fe$_2$(SO$_4$)$_3$, Cr$_2$(SO$_4$)$_3$, [Co(NH$_3$)$_4$Cl$_2$]Cl;

in yet another embodiment of the synthesis, the reaction may be conducted by providing only the diamagnetic reactant being a polycyanide complex to the system, for example of the general formula A$_y$[M$^{dia}$(CN)$_x$], where x≥2, or only a paramagnetic reactant that is a polycyanide complex, for example, with the general formula A$_y$[M$^{para}$(CN)$_x$], which is the reactant being also the donor of cyanide ligands. In this embodiment of the synthesis, in the initial synthesis phase, the para- or diamagnetic reactant introduced into the system undergoes an oxidation or reduction reaction to form the other (missing) reactant, para- or diamagnetic, respectively. Finally, para-/diamagnetic reactant system is obtained, which is then reacted to yield the molecular magnetic material according to the invention. This example of synthesis may be implemented when one d-electron metal can take both diamagnetic and paramagnetic forms depending on its degree of oxidation, passing, due to the reaction of oxidation or reduction, from a paramagnetic to a diamagnetic form, respectively;

in a further embodiment of the synthesis, the reaction may be carried out by providing the donor of cyanide ligand (A-CN) to the system, which is not the paramagnetic or diamagnetic reactant; in this embodiment, the cyanide ligands (—CN) are coordinated to the paramagnetic and/or diamagnetic reactant to obtain the polycyanide complex of a diamagnetic and/or a paramagnetic properties, the obtained complex being respectively (A$_y$[M$^{para}$(CN)$_x$] and/or A$_y$[M$^{dia}$(CN)$_x$]).

By means of the method according to the invention, the reaction of the synthesis of the molecular magnetic material may be conducted i.a. in a solution, or in a solid phase, i.a. by the use of grinding, breaking up, sonicating, or heating, for example involving melting, depending on the form of the substrates used. Moreover, the reaction of synthesis according to the developed method may involve precipitation of the product, for example using precipitating solvents, or evaporation of the reaction mixture to yield the product as a solid.

Accordingly, the magnetic material obtained using the method according to the invention may be consolidated (precipitated) into a solid form by adding a cation forming strong (or passive) bonds with nitrogen atoms of cyanide ligands (solid magnetic materials), or forming weak (or labile) bonds to obtain ferromagnetic liquids. In the latter case, ferromagnetic liquids may also be obtained by the use of a solvent which, without altering the structure of a solid ferromagnetic material, will dissolve it, while retaining its magnetic properties. In the latter case, the liquid ferromagnetic material can (depending on the concentration) take the form of a stable colloid.

This invention does not, however, include a reaction system comprising both the paramagnetic reactant: [W(CN)$_6$(NN)]$^-$ and the diamagnetic reactant: [W(CN)$_6$(NN)]$^{2-}$, where NN is a bidentate NN-donor substituent, where the reaction occurs between the paramagnetic (tungsten (V)) reactant and the diamagnetic (tungsten (IV)) reactant.

The compounds obtained as a result of the conducted synthesis, according to the present invention, are the molecular magnetic materials based on cyanide components exhibiting ferromagnetic properties at Curie temperature (Tc) and at lower temperatures, wherein the Tc for the class of compounds obtained using the method according to the invention is at least 253 K, while some of the compounds in this group exhibit ferromagnetic properties at temperatures close to 0° C., while others exhibit ferromagnetic properties at room temperature, up to the temperature of thermal decomposition of the compound. The preservation of ferromagnetic properties at various temperatures depends on the individual composition of reactants used in the synthesis, and thus on the individual structure of the product yielded by the synthesis.

The crystalline (molecular) structure of the compounds obtained by the method according to the present invention is not entirely deciphered. However, it is assumed that these compounds are oligomers comprising in the molecule only a few repetitive units connected by cyanide bridges. Moreover, these compounds in a magnetically ordered form contain in their structure atoms of paramagnetic and diamagnetic d-electron metal.

It is assumed that the obtained material does not have an extensive three-dimensional structure of high molecular weight, and this may contribute to the observed ferromagnetic properties at high temperatures and the observed value of magnetic susceptibility of the materials claimed. The synthesis conditions used (e.g. temperature, molar ratio of the diamagnetic material to the paramagnetic material, type of cation used) determine the range of ferromagnetic ordering and allow to modify the material properties to a broad extent.

Moreover, it is assumed that the oligomeric structure of the molecular magnetic material may be due to the fact that, during the synthesis claimed hereby, the system becomes highly defected due to the existence of a steric hindrance: for example, in Example 22 below, iron remains octaedric, wherein the Fe—CN—Fe bond should be linear (due to the configuration of the respective electron orbitals), so that the resulting system does not form long-range polymer chains.

Moreover, the synthesis method according to the invention includes systems in which both paramagnetic and diamagnetic reactants may not comprise labile cyanide (—CN) ligands, and each of the reactants may be a kinetically and thermodynamically stable metal complex with cyanide ligands, e.g. as in Example 22 below, which illustrates the reaction of stable [Fe(CN)$_6$]$^{3-/4-}$ complexes. Systems of this type theoretically do not involve the formation of Fe—CN—Fe bridges, and magnetic interaction between anions occurs through potassium cations. Nevertheless, the reaction product in Example 22 is a molecular magnetic material which retains its ferromagnetic properties at high temperatures (such as 70° C.) and when heated, it is gradually transformed (in the presence of oxygen) into ferromagnetic iron oxides. Moreover, this material is photosensitive, which means that the ferromagnetic properties are altered when exposed to an electromagnetic wavelength of <450 nm due to the release of cyanide ligands and a change in the system structure. It is assumed that in the reaction conducted (Example 22) KCN is released and only short-chain (oligomeric) Fe—CN—Fe systems are formed between a few iron atoms.

Example 12 below illustrates a synthesis which is a reaction of synthesis a modified Turnbull's blue. The synthesis according to the invention is conducted at elevated temperature, and the product obtained is a molecular magnetic material constituting a defected system with the formula Fe$_3$[Fe(CN)$_6$]$_2$ in which some Fe(II) atoms may be replaced by potassium cations. This compound, obtained according to the invention, has ferromagnetic properties at temperatures as high as 80° C. Moreover, the material obtained is photosensitive, and its ferromagnetic properties change upon exposure to light with a wavelength in the range of 200 to 1200 nm. Thus, the product of the synthesis according to Example 12 does not have the characteristics attributed to Turnbull's blue (identical to Prussian blue), which indicates a different course of this reaction.

Thus, the molecular magnetic materials obtained by the method according to the invention distinguish from other materials of this type in that they have ferromagnetic properties at a temperature of at least 253 K and higher, wherein the temperature of disappearance of ferromagnetic properties is an individual feature of a particular material depending on its chemical composition.

EXAMPLES

Examples presented below describe some possible embodiments of a synthesis of molecular magnetic material according to the invention.

The following are examples of a synthesis of molecular magnetic material wherein at least one of the reactants is a polycyanide complex comprising at least two cyanide (—CN) ligands:

Example 1

50 mL of 1M $K_4[Fe(CN)_6]$ solution was mixed with 50 mL of 1M $K_3[Fe(CN)_6]$ solution. The mixture was heated to boiling, followed by adding excess 50 mL of 4M $Cd(NO)_3$ solution. The mixture was heated to boiling for approximately 5 minutes and then cooled, and the separated product was filtered using a glass filter, washed 3 times with water and 3 times with acetone. The resulting product was air-dried.

Example 2

105 mg of $(PPh_4)_2[W(CN)_6(bpy)].2H_2O$ solution in 10 mL MeCN (MeCN denotes acetonitrile) was mixed with 210 mg of $K_3[Fe(CN)_6].H_2O$ solution in 10 mL of water. The solutions were heated to boiling, followed by precipitation of the product by adding 300 mg of copper(II) acetate dissolved in 20 mL of ethanol. The mixture was heated to boiling for approximately 5 minutes. The product was filtered, washed with ethanol until the colour of the copper acetate in the filtrate was no longer visible, washed with water (3 times with portions of approximately 5 mL each) and then with acetone (3 times with portions of approximately 5 mL each), and then air-dried.

Example 3

10 mL of 1 M $K_4[Mo(CN)_8]$ solution was mixed with 10 mL of 1 M $K_3[Mo(CN)_8]$ solution. The mixture was heated to boiling, followed by adding excess (10 mL of 4 M aqueous solution) $Cd(NO_3)_2$. The mixture was heated to boiling for approximately 5 minutes and then cooled, and the separated product was filtered using a glass filter, washed 3 times with water and 3 times with acetone. The resulting product was air-dried. 98% yield.

Example 4

200 mg of $K_4[Mo(CN)_8].2H_2O$ solution in 10 mL water was mixed with 410 mg of $K_3[Fe(CN)_6].H_2O$ solution in 10 mL of water. The solutions were heated to boiling, followed by precipitation of the product by adding 300 mg of copper (II) acetate dissolved in 20 mL of ethanol. The mixture was heated to boiling for approximately 5 minutes. The product was filtered, washed with ethanol until the colour of the copper acetate in the filtrate was no longer visible, washed with water (3 times with portions of approximately 5 mL each), with acetone (3 times with portions of approximately 5 mL each), and air-dried.

Example 5

4.2215 g of $K_4[Fe(CN)_6].3H_2O$ and 3.2970 g $K_3[Fe(CN)_6]$ (1:1 Fe(II)/Fe(III) molar ratio) was dissolved in 50 mL of water, heated to 80° C. and 11.8930 g of $Zn(NO_3)_2.6H_2O$ in 40 mL of water was added. The precipitate was filtered, washed 3 times with distilled water (approximately 25 in each portion) and 3 times with acetone (75 mL in total). It was air-dried.

Example 6

7.0325 g of $K_4[Fe(CN)_6].3H_2O$ and 1.0947 g $K_3[Fe(CN)_6]$ (5.67:1 Fe(II)/Fe(III) molar ratio) was dissolved in 50 mL of water, heated to 80° C. and 11.9106 g of $Zn(NO_3)_2.6H_2O$ in 40 mL of water was added. The precipitate was filtered, washed 3 times with distilled water (approximately 25 in each portion) and 3 times with acetone (75 mL in total). It was air-dried.

Example 7

1.4070 g of $K_4[Fe(CN)_6].3H_2O$ and 5.4580 g $K_3[Fe(CN)_6]$ (1:5 Fe(II)/Fe(III) molar ratio) was dissolved in 50 mL of water, heated to 80° C. and 12.0322 g of $Zn(NO_3)_2.6H_2O$ in 40 mL of water was added. The precipitate was filtered, washed 3 times with distilled water (approximately 25 in each portion) and 3 times with acetone (75 mL in total). It was air-dried.

Example 8

1.0101 g of $K_4[Fe(CN)_6].3H_2O$ and 1.0097 g $K_3[Fe(CN)_6]$ (1:1 Fe(II)/Fe(III) molar ratio) was triturated in a ceramic crucible for approximately 3 minutes. Approximately 15 mL of water was poured into the mixture and excess $Cd(NO_3)_2$ was added. The precipitate formed was filtered, washed with water and acetone (3 times, in portions of approximately 20 mL of solvent each). It was air-dried.

Example 9

1.0840 g $K_4[Fe(CN)_6].3H_2O$, 1.0023 g of $K_3[Fe(CN)_6]$ and 1.0912 g of $Cu(CH_3COO)_2.H_2O$ was triturated in a ceramic crucible for approximately 4 minutes. Approximately 15 mL of water was then added, the mixture was boiled for approximately 5 minutes and filtered. The precipitate was washed with water and acetone (in amounts as in synthesis 7) and air-dried.

Example 10

1.0010 g $K_4[Fe(CN)_6].3H_2O$, 1.0133 g of $K_3[Fe(CN)_6]$ and 1.2575 g of $MnSO_4.4H_2O$ was triturated in a crucible for 3 minutes. Water was then poured into the preparation, this was boiled, the precipitate filtered, washed with water and acetone as in Example 7.

Example 11

0.9964 g $K_4[Fe(CN)_6].3H_2O$, 0.3060 g of $K_3[Fe(CN)_6]$ was triturated in a crucible for 2 minutes. 20 mL of water was added to the mixture, excess cadmium nitrate was added, and this was boiled for approximately 2 minutes. The precipitate was filtered as in synthesis 7.

Example 12

1.000 g of $K_3[Fe(CN)_6]$ weight was dissolved in approximately 20 mL $H_2O$, mixed with excess $FeSO_4.6H_2O$. The mixture was boiled, the precipitate filtered, washed with water and acetone (portions of approximately 10 mL). It was air-dried.

Example 13

0.6010 g of $K_3[Fe(CN)_6]$ and 0.5024 g $K_3[Co(CN)_6]$ was dissolved in 15 mL of water with heating until a clear solution was obtained. Excess saturated solution of cadmium nitrate in water was then added and this was heated to boiling for approximately 5 minutes. The precipitate was filtered, washed with water and acetone (3 times in total, approximately 50 mL of water and 50 mL of acetone were used) and air-dried.

Example 14

0.6042 g of sodium nitroprusside ($Na_2[Fe(CN)_5NO]$) and 0.6080 g $K_3[Co(CN)_6]$ was dissolved in 15 mL of water while heating until a clear solution was obtained. Excess saturated solution of cadmium nitrate in water was then added and this was heated to boiling for approximately 5 minutes. The precipitate was filtered, washed with water and acetone (3 times in total, approximately 50 mL of water and 50 mL of acetone were used) and air-dried.

Example 15

0.6123 g of sodium nitroprusside and 1.0550 g of $K_3[Fe(CN)_6]$ was dissolved in 15 mL of water and heated until a clear solution was obtained. Excess saturated solution of cadmium nitrate was then added. The mixture was heated to boiling for approximately 5 minutes, after which the precipitate was filtered, washed with water and acetone (as in Example 14) and air-dried.

Example 16

1.0021 g of $K_3[Fe(CN)_6]$ and 0.3062 g of $K_4[Mo(CN)_8].2H_2O$ was dissolved in 15 mL of water and heated to boiling. Excess saturated solution of cadmium nitrate was then added. The precipitate was heated to boiling for approximately 5 minutes, the precipitate was filtered, washed with water and acetone, as in Example 14 and air-dried.

The following are examples of synthesising molecular magnetic material, wherein at least one of the reactant is not a polycyanide complex, and the polycyanide complex is obtained by coordinating cyanide ligands derived from the donor of these groups (—CN) with a diamagnetic and/or paramagnetic reactant:

Example 17

4.0 g KCN was added to a solution of 1.0 g of $K_4[Fe(CN)_6].H_2O$ in 20 mL of water, followed by 1.50 g of iron(III) chloride (based on anhydrous $FeCl_3$). The mixture was heated to approximately 70° C., and then the excess (20 mL of 2 M aqueous solution) $Zn(NO_3)_2$ was added. The mixture was heated to boiling, the precipitate was filtered, washed with water (3 times with 10 mL portions), then with acetone (3 times with 5 mL portions) and air-dried.

Example 18

40 mL of distilled water was added to a mixture of 1.5 g of anhydrous $FeCl_3$ and 2.0 g $FeSO_4.6H_2O$, followed by 4.0 g of KCN. The mixture was heated for 5 minutes to approximately 50° C., and then for 10 minutes to approximately 90° C. The mixture was cooled, filtered, the precipitate was washed 3 times with 25 mL of $H_2O$, then 3 times with 25 mL of acetone and air-dried.

The following are examples of synthesising a molecular magnetic material, wherein the mixture of the paramagnetic and diamagnetic reactants obtained by oxidation or reduction of the paramagnetic or diamagnetic reactant, respectively:

Example 19

20 mL of 0.1 M $KMnO_4$ solution was added to 20 mL of 1 M $K_4[W(CN)_8]$ solution acidified with 5 mL of 0.2 M $HNO_3$ (to obtain a 1:1 W(IV) W(V) molar ratio). The mixture was heated to boiling, and then the product was precipitated by adding excess (20 mL of 2M aqueous solution) $Zn(NO_3)_2$. The mixture was heated for approximately 5 more minutes to approximately 80° C., and the precipitated product was filtered, washed 3 times with water (5 mL portions), 3 times with acetone (5 mL portions) and air-dried.

Example 20

3 drops (approximately 0.15 mL each) of concentrated (65%) $HNO_3$ and 2 drops (approximately 0.1 mL each) of 30% $H_2O_2$ were added to the solution of 2.0 g of $K_4[W(CN)_8].2H_2O$ in 20 mL $H_2O$. The mixture was heated to boiling for approximately 1 minute, and then cooled in a refrigerator to room temperature. The solution was divided into 4 equal portions:
  a) 3.4 mL of 1 M $K_4[W(CN)_8].2H_2O$ solution (1:1 W(V)/W(IV) ratio) and excess $Zn(NO_3)_2$ solution were added to one portion of the solution until the precipitation was complete. The mixture was filtered, the precipitate was washed with distilled water 4 times (approximately 50 mL in total) and acetone (4 times, approximately 30 mL in total) and air-dried;
  b) the second portion of the solution was handled as in a) above, with the mixture being heated to boiling for approximately 1 minute after precipitation;
  c) the remained 2 portions of the solution were joined, an excess of saturated solution of $AgNO_3$ in water was added to it, until $Ag_3[W(CN)_8]$ was completely precipitated. Silver salt was filtered, washed with water until the filtrate was free from Ag+ ions (no AgCl precipitation). The precipitate was treated with small excess of saturated KCl solution, and the separated AgCl was filtered. The filtrate was divided into two portions and handled as in a and b above.

The reaction yielded three (a, b and c above) molecular magnetic materials based on polycyanide d-electron metal complexes.

Example 21

0.4 ml of 100% hydrazine monohydrate was added to a solution of 4.0 g $K_3[Fe(CN)_6].H_2O$ in 20 mL of water. The mixture was heated to approximately 90° C., and then excess aqueous solution of $Zn(NO_3)_2$ (30 mL of 2 M solution) was added. The mixture was heated to boiling, the precipitate was filtered, washed with water (3 times with 10 mL portions), then with acetone (3 times with 5 mL portions) and air-dried.

The following are examples of synthesising a molecular magnetic material, wherein the material is obtained by a reaction occurring in the solid phase:

Example 22

1.0 g of solid $K_4[Fe(CN)_6].2H_2O$ was mixed with 1.0 g of solid $K_3[Fe(CN)_6].H_2O$. The mixture was triturated in an agate crucible until magnetic susceptibility reached its maximum value (approximately 40 minutes).

Example 23

1.0 g of solid $K_4[Fe(CN)_6].2H_2O$ was mixed with 1.0 g of solid $K_3[Fe(CN)_6].H_2O$ and 3.0 g of solid copper acetate(II). The mixture was triturated in an agate crucible until magnetic susceptibility reached its maximum value (approximately 40 minutes). The product was washed several times with hot ethanol (approximately, a total of 100 mL of ethanol was used) to wash out unreacted copper acetate completely. The preparation was then washed 3 times with water (5 mL portions), and 3 times with acetone (5 mL portions), and air-dried.

Example 24

0.12 g of solid salt $(PPh_4)_3[W(CN)_7(O_2)]$ and 0.080 g of $K_3[Fe(CN)_6]$ was triturated in an agate crucible until the maximum gram of magnetic susceptibility was obtained (approximately 25 minutes), after which 0.2 g of solid $Gd(NO_3)_3$ (based on anhydrous salt) was added, and the trituration was continued for 10 minutes. The product was washed with a small amount of acetone (10 mL), dissolved in water and excess (approximately 15 ml) acetone and dried.

Example 25

0.4 g of $(bpyH)_3H_3O[W(CN)_8].H_2O$ with 0.4 g of $K_3[Fe(CN)_6].H_2O$ was triturated in a ceramic mortar, and then transferred into a porcelain crucible and melted by heating it with a burner. The mixture was kept in the melted state for approximately 60 seconds, and then cooled. The preparation was triturated in a mortar and then washed 4× with methanol (portions of approximately 10 mL).

In all the examples 1 to 25 above, the reactions conducted yielded the molecular magnetic materials based on d-electron metal polycyanide complexes exhibiting ferromagnetic properties at room temperature.

Ferromagnetic properties of the obtained molecular magnetic materials have been validated, inter alia, by measuring magnetic susceptibility of the obtained materials using the "SHERWOOD SCIENTIFIC magnetic susceptibility balance".

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A method for synthesising a molecular magnetic material, comprising the steps of:
   producing a mixture comprising components:
      a paramagnetic reactant comprising a d-electron metal in a paramagnetic form selected from the group consisting of: Fe, Co, Mo, W and Mn,
      a diamagnetic reactant comprising a d-electron metal in a diamagnetic form, selected from the group consisting of: Fe, Co, Mo, W and Mn,
      at least one donor of cyanide (CN—) ligands being a separate compound and/or contained in the paramagnetic reactant and/or in the diamagnetic reactant,
      at least one cation having coordination sites for binding cyanide nitrogen atoms from the donor of cyanide ligands,
      except for a mixture of reactants simultaneously comprising as the paramagnetic reactant: $[W(CN)_6(NN)]^-$ and as the diamagnetic reactant: $[W(CN)_6(NN)]^{-2}$, where NN is a bidentate NN-donor substituent,
   carrying out a reaction of the components of the mixture to form coordination bonds between the cation and cyanide nitrogen atoms derived from the donor of cyanide ligands, to obtain a polycyanide complex being the molecular magnetic material.

2. The method according to claim 1, wherein at least one cation is of an element selected from the group consisting of: Zr, Hf, La, Sc, Y, V, Nb, Ta, Cr, Mn, Fe, Co, Ni, Ru, Rh, Pd, Ir, Pt, Cu, Ag, Au, Zn, Cd, Hg, Ga, In, Tl, Sn, Pb, Sb, Bi, Po, Ce, Pr, Nd, Pm, Sm, Eu, Gd, Tb, Dy, Ho, Er, Tm, Yb and Lu.

3. The method according to claim 1, comprising carrying out the reaction in a temperature ranging from 253 K to 400 K.

4. The method according to claim 1, comprising carrying out the reaction in a temperature ranging from 293 K to 400 K.

5. The method according to claim 1, wherein the paramagnetic reactant is a d-electron paramagnetic metal polycyanide complex comprising at least two cyanide ligands, constituting also a cyanide ligand donor.

6. The method according to claim 5, wherein the diamagnetic reactant is a salt of a d-electron metal in a diamagnetic form.

7. The method according to claim 5, wherein the step of producing the mixture comprising the paramagnetic reactant and the diamagnetic reactant comprises
   providing the paramagnetic reactant being a polycyanide complex of the general formula $A_y[M^{para}(CN)_x]$ being the donor of cyanide ligands (CN) and the donor of the cation ($M^{para}$) having coordination sites for binding cyanide nitrogen atoms from the donor of cyanide ligands, and
   partially oxidizing or reducing of the metal in the paramagnetic form ($M^{para}$) to the diamagnetic form ($M^{dia}$) of that metal.

8. The method according to claim 1, wherein the diamagnetic reactant is a d-electron diamagnetic metal polycyanide complex comprising at least two cyanide ligands, constituting also a cyanide ligand donor.

9. The method according to claim 8, wherein the paramagnetic reactant is a salt of a d-electron metal in a paramagnetic form.

10. The method according to claim 8, wherein the step of producing the mixture comprising the paramagnetic reactant and the diamagnetic reactant comprises providing the diamagnetic reactant being a polycyanide complex of the general formula $A_y[M^{dia}(CN)_x]$ being the donor of cyanide ligands (CN) and the donor of the cation ($M^{dia}$) having coordination sites for binding cyanide nitrogen atoms from the donor of cyanide ligands, and partially oxidizing or reducing of the metal in the diamagnetic form ($M^{dia}$) to the paramagnetic form ($M^{para}$) of that metal.

11. The method according to claim 1, wherein the diamagnetic reactant or the paramagnetic reactant is a salt comprising at least one of the ions selected from the group consisting of: $[Fe(CN)_6]^{3-}$, $[Fe(CN)_6]^{4-}$, $[Mo(CN)_8]^{3-}$, $[Mo(CN)_8]^{4-}$, $[Co(CN)_6]^{2-}$, $[Co(CN)_6]^{3-}$, $[Mn(CN)_6]^{3-}$, $[Mn(CN)_6]^{5-}$, $[Mn(CN)^6]^{4-}$, $[W(CN)_6(bpy)]^{-}$, $[W(CN)_6(bpy)]^{2-}$, $Fe^{2+}$, $Mn^{2+}$ and $Co^{2+}$.

12. The method according to claim 1, wherein the diamagnetic reactant is a salt of d-electron metal in diamagnetic form, and the paramagnetic reactant is a salt of d-electron metal in paramagnetic form.

13. The method according to claim 1, wherein the donor of cyanide ligand is synthesized from potassium cyanide (KCN) and simple slats of d-electron metals selected from the group consisting of: Fe, Co, Mo, W and Mn.

14. The method according to claim 1, comprising carrying out the reaction in a solid or a liquid phase, wherein the product of the reaction carried out in the liquid phase is obtained either by precipitation thereof in the form of an insoluble salt or by evaporation of the solvent.

15. The method according to claim 1, wherein the mixture comprises the following components as the paramagnetic reactant mixed with the diamagnetic reactant:

K4[Fe(CN)6] mixed with K3[Fe(CN)6], or
(PPh4)2[W(CN)6(bpy)].2H2O mixed with K3[Fe(CN)6].H2O, or
K4[Mo(CN)8] mixed with K3[Mo(CN)8], or
K4[Mo(CN)8].2H2O mixed with K3[Fe(CN)6].H2O, or
K4[Fe(CN)6].3H2O mixed with K3[Fe(CN)6], or
K3[Fe(CN)6] mixed with FeSO4.6H2O, or
K3[Fe(CN)6] mixed with K3[Co(CN)6], or
Na2[Fe(CN)5NO] mixed with K3[Co(CN)6], or
K3[Fe(CN)6] mixed with K4[Mo(CN)8].2H2O, or
K4[Fe(CN)6].H2O mixed with FeCl3 mediated by KCN, or
FeCl3 mixed with FeSO4.6H2O mediated by KCN, or
K4[W(CN)8] mixed with its oxidation product comprising W(V), or
K3[Fe(CN)6].H2O mixed with its reduction product comprising Fe(II), or
K4[Fe(CN)6].2H2O mixed with K3[Fe(CN)6].H2O, or
(PPh4)3[W(CN)7(02)] mixed with K3[Fe(CN)6], or
(bpyH)3H3O[W(CN)8].H2O mixed with K3[Fe(CN)6].H2O, wherein $bpyH^+$ denotes monoprotonated 2,2'-bipiridyne, and $PPh_4^+$ denotes tetraphenylphosphonium cation.

16. A molecular magnetic material that is a product of a reaction of the following components:

a paramagnetic reactant comprising a d-electron metal in a paramagnetic form selected from the group consisting of: Fe, Co, Mo, W and Mn, a diamagnetic reactant comprising a d-electron metal in a diamagnetic form, selected from the group consisting of: Fe, Co, Mo, W and Mn, at least one donor of cyanide (CN—) ligands being a separate compound and/or contained in a paramagnetic and/or diamagnetic reactant, at least one cation having coordination sites capable for binding cyanide nitrogen atoms from the donor of cyanide ligand, except for a mixture of reactants simultaneously comprising as the paramagnetic reactant:

[W(CN)6(NN)]— and as the diamagnetic reactant: [W(CN)6(NN)]2-, where NN is a bidentate NN-donor substituent, wherein the molecular magnetic material has coordination bonds between the cation and cyanide nitrogen atoms derived from the donor of cyanide ligand.

* * * * *